(12) United States Patent
Newman et al.

(10) Patent No.: US 10,739,056 B2
(45) Date of Patent: Aug. 11, 2020

(54) SNOW AND ICE REMOVAL FOR IMPINGER

(71) Applicant: Messer Industries USA, Inc., Bridgewater, NJ (US)

(72) Inventors: Michael D. Newman, Hillsborough, NJ (US); Scott Boyles, Telford, PA (US)

(73) Assignee: Messer Industries USA, Inc., Wilmington, DE (US)

( * ) Notice: Subject to any disclaimer, the term of this patent is extended or adjusted under 35 U.S.C. 154(b) by 395 days.

(21) Appl. No.: 15/295,082

(22) Filed: Oct. 17, 2016

(65) Prior Publication Data

US 2018/0106525 A1    Apr. 19, 2018

(51) Int. Cl.
| | |
|---|---|
| *F25D 21/06* | (2006.01) |
| *A23L 3/16* | (2006.01) |
| *A23L 3/00* | (2006.01) |
| *F25D 13/06* | (2006.01) |
| *F25D 17/02* | (2006.01) |

(52) U.S. Cl.
CPC ............ *F25D 21/065* (2013.01); *A23L 3/003* (2013.01); *A23L 3/165* (2013.01); *F25D 13/067* (2013.01); *F25D 17/02* (2013.01); *F25D 2317/0661* (2013.01); *F25D 2317/0665* (2013.01)

(58) Field of Classification Search
CPC .................................................... F25D 21/065
USPC ......................................................... 62/380
See application file for complete search history.

(56) References Cited

U.S. PATENT DOCUMENTS

| | | |
|---|---|---|
| 6,263,080 B1 | 7/2001 | Newman et al. |
| 6,434,950 B2 | 8/2002 | Newman et al. |
| 6,877,327 B2 | 4/2005 | Newman et al. |
| 2002/0031583 A1* | 3/2002 | Perrine ...................... A23L 3/10 426/467 |
| 2004/0099005 A1* | 5/2004 | Newman ................... F25D 3/11 62/374 |
| 2006/0248913 A1 | 11/2006 | Gasteyer et al. |
| 2012/0318884 A1 | 12/2012 | McCormick et al. |
| 2015/0027140 A1* | 1/2015 | Dubreuil ................... A23L 3/36 62/63 |
| 2016/0223246 A1* | 8/2016 | Siljeborn ................ F25D 21/06 |

OTHER PUBLICATIONS

European Search Report for EP 16206898.5, dated May 19, 2017, 9 pages.

* cited by examiner

*Primary Examiner* — Elizabeth J Martin
(74) *Attorney, Agent, or Firm* — Joshua L. Cohen

(57) ABSTRACT

A method of reducing a temperature of at least one item including: transporting the at least one item on a moving substrate within an enclosure, the enclosure including at least one impingement apparatus; providing a coolant to at least one of a high pressure zone or a low pressure zone of the enclosure; circulating the coolant through the high and low pressure zones using a variable-speed gas circulation device of the impingement apparatus; directing impingement jets through openings in at least one impinger of the impingement apparatus toward the moving substrate disposed within the low pressure zone; and intermittently performing an operation on the at least one impingement apparatus during said transporting including: (i) reducing a speed of the variable-speed gas circulation device; (ii) vibrating the at least one impinger; and (iii) increasing the speed of the variable-speed gas circulation device.

14 Claims, 4 Drawing Sheets

SNOW AND ICE REMOVAL FOR IMPINGER

BACKGROUND

The present embodiments relate to methods of at least partially removing snow and ice from an impinger of an impingement apparatus.

Commercial cooling apparatus, such as commercial freezers, typically rely on the transfer of heat from an item, such as a food product, that is to be chilled or frozen by using a fan or blower. In many instances, the fan or blower is situated near a conveyer belt upon which the item is being carried. The item entering the freezer has a boundary layer of air surrounding it which insulates the item from the surrounding atmosphere. Traditional freezers have employed blowers that generate currents of cooling vapor in many directions. However, a significant portion of the cooling vapor does not contact the item, and in many instances does not contact the item in a direction transverse to the item's movement, such as in a perpendicular direction. Under these conditions, the cooling vapor which does contact the item often does not possess sufficient energy to substantially reduce the thickness of the boundary layer at or around the surface of the item. Therefore, there has been a need to generate directed jets of cooling vapor to disturb the boundary layer and increase heat transfer at the item.

Previous attempts to generate directed jets of cooling vapor to the item have included using a plurality of vertical tubes to provide a unidirectional air flow toward the item, and the use of a plurality of nozzles along the pathway of an item for delivering discrete jets of unidirectional cooling air. However, the use of tubes or nozzles to direct air in a cooling or freezing device has met with only limited success due to the build-up of condensation in the form of snow and/or ice in the tubes or nozzles. Such build up quickly reduces the efficacy of the cooling or freezing devices.

Another previous attempt included heating or cooling an item on a moving substrate in which a continuous channel traversing at least a major portion of the width of the moving substrate converts multi-directional flow into unidirectional flow. However, this attempt suffers from having such an increased rate of flow that the items become entrained in the flow, and, consequently, controlled processing of the item through the device becomes difficult.

Increasing the velocity of the stream of cooling vapor (such as a cryogen) which impinges the item will increase the average heat transfer coefficient in a linear manner. At a certain point, however, unless the impingement stream of cooling vapor is carefully controlled, its velocity may be sufficient to damage the item, or to displace the item from and carry same off the conveyor, and into undesirable locations elsewhere in the freezer.

The total heat transfer rates are dependent on local heat transfer coefficients. That is, the amount of heat transferred from the items to the coolant is dependent on the rate of heat transfer locally between the coolant and the item. Local heat transfer rates can be changed by controlling the distance from the source of impingement stream to the item, the velocity of the impingement stream, the turbulence in the impingement stream, and the efficiency of the flow of coolant for the impingement stream.

Heat transfer and coolant flow may be adequately controlled by using an impingement apparatus comprising an impinger, such as an impingement plate, having openings to direct the flow of coolant. Over time during operation of such an impingement apparatus, snow and ice accumulate and may build up on the impinger, thereby reducing the efficiency of heat transfer provided by the impingement apparatus. In order to at least partially remove snow and/or ice from the impinger, vibration has been used to break up the snow and/or ice, which is then free to pass through the impinger, at least partially restoring the efficiency of the impingement apparatus. Some impingement apparatus may provide high pressure differentials on opposing sides of the impinger. In these instances, the high pressure differential may dampen vibration imparted to the impinger, reducing the effectiveness of the vibration to break up snow and/or ice on the impinger.

What is needed is a means by which snow and ice may be at least partially removed from an impinger which experiences a high pressure differential on opposing sides of the impinger.

SUMMARY

Provided is a method of reducing a temperature of at least one item comprising: transporting the at least one item on a moving substrate within an enclosure, the enclosure comprising at least one impingement apparatus comprising: (a) a barrier defining a low pressure zone and a high pressure zone within the enclosure, (b) at least one impinger comprising openings, the at least one impinger being supported by the barrier and separating the high pressure zone from the low pressure zone for maintaining a pressure differential between the high and low pressure zones, and (c) a variable-speed gas circulation device in fluid communication with the high pressure zone and the low pressure zone for maintaining a pressure of the high pressure zone; providing a coolant to at least one of the high pressure zone or the low pressure zone; circulating the coolant through the high and low pressure zones using the variable-speed gas circulation device; directing impingement jets of circulating coolant through the openings of the at least one impinger and toward the moving substrate; and intermittently performing an operation on the at least one impingement apparatus during said transporting comprising: (i) reducing a speed of the variable-speed gas circulation device for decreasing the pressure differential between the high pressure zone and the low pressure zone, (ii) vibrating the at least one impinger after said reducing the speed of the variable-speed gas circulation device for breaking up snow and/or ice accumulated on the at least one impinger, and (iii) increasing the speed of the variable-speed gas circulation device after said vibrating the at least one impinger for returning the pressure differential to a pressure differential substantially similar to the pressure differential existing prior to said reducing the speed of the variable-speed gas circulation device.

BRIEF DESCRIPTION OF THE DRAWING(S)

The accompanying drawings are included to provide a further understanding of the apparatus and method(s) provided herein and are incorporated in and constitute a part of this specification. The drawings illustrate embodiments of the apparatus and method(s) provided herein and, together with the description, serve to explain the principles described herein but are not intended to limit the specification or any of the claims.

DESCRIPTION

Figure 1:
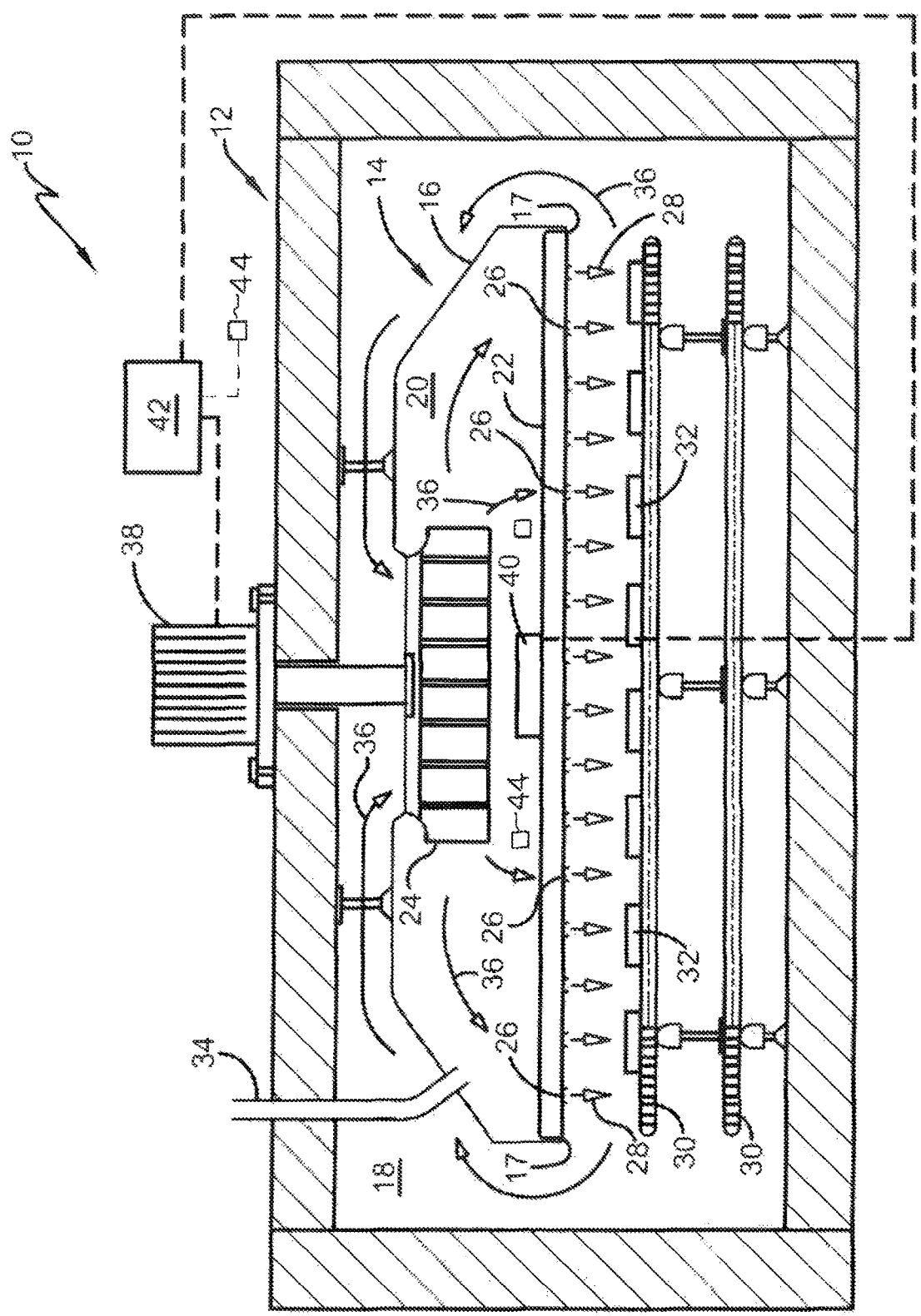
FIG. 1 is a cross-sectional view of a first embodiment of an apparatus used in the methods described herein.

The present embodiments are directed to methods for reducing a temperature, such as cooling and/or freezing, of at least one item, such as a food product(s), using an impingement apparatus, including at least partially removing snow and ice from an impinger of the impingement apparatus. The item(s) are transported within an enclosure, such as a food freezer, using a moving substrate. The enclosure comprises the impingement apparatus, and the impingement apparatus defines a low pressure zone and a high pressure zone within the enclosure. A coolant, such as a cryogen, is provided to the high pressure zone, and circulated through the high pressure zone and the low pressure zone using a variable-speed gas circulation device.

The term "cryogen" as used herein is similar to the term "coolant", and is not intended to necessarily be limited to materials and/or substances which have a purely cryogenic effect, although that meaning is intended to be included in the use of "cryogen". The term "coolant" as used herein means any material and/or substance which provides a cooling effect to or reduces a temperature of an item.

The heat transfer cooling or freezing of the item(s) results generally from the impingement of a stream of cryogen vapor on the item via the impingement jets. Additional heat transfer may also be achieved by spraying or mixing liquid or solid cryogen into the impingement jet streams of cryogenic vapor.

The transfer of heat from an item, such as a food product, to a cryogen is maximized through the use of an impingement apparatus by which solid or liquid cryogen is sprayed into gas (such as carbon dioxide or nitrogen) circulated at the item to contact same while using an impinger to create a stream of cryogen. The design of the device increases the heat transferred from the item to the cryogen. The cryogen, for example solid carbon dioxide snow or nitrogen liquid, is introduced into an impinging flow of gas, wherein heat transfer occurs with respect to the gas and the item, to cool the item during impingement.

The use of the impingement apparatus increases the amount of heat transferred from an item to the cryogen, by facilitating and generating impingement jets capable of breaking through the thermal boundary layer of the item, but which are not capable of damaging the item. A force of the impingement jets contacting the boundary layer compromises a structural integrity of said layer in order to penetrate same.

Thus, the impingement apparatus comprises the impinger, which comprises openings through which impingement jets are directed toward the moving substrate, and thus the item(s). During normal operation of the methods described herein, snow and/or ice may build up on the impinger, reducing the efficiency of heat transfer from the item(s) to the coolant. In order to break up snow and/or ice accumulated on the impinger, the impinger is vibrated, and the broken-up snow and/or ice is free to pass through the impinger via gravity and/or turbulent flow of the coolant vapor in the high pressure zone.

In order to maximize the effectiveness of the vibration, an operation may be performed intermittently, such as at regular intervals or as needed based on snow and/or ice build-up on the impinger. The operation comprises: reducing a speed of the variable-speed gas circulation device for decreasing a pressure differential between the high pressure zone and the low pressure zone; vibrating the impinger to break up snow and/or ice having accumulated on the impinger; and increasing the speed of the variable speed gas circulation device to restore the desired pressure differential between the high pressure zone and the low pressure zone. The increase in speed of the gas circulation device may result in creation of turbulent flow across the surface of the impinger which is disposed in the high pressure zone, forcing the snow and/or ice through the openings in the impinger, thereby at least partially cleaning the impinger.

Provided is a method of reducing a temperature of at least one item (such as at least one food product) comprising: transporting the at least one item on a moving substrate within an enclosure (such as a food freezer), the enclosure comprising at least one impingement apparatus comprising: (a) a barrier defining a low pressure zone and a high pressure zone within the enclosure, (b) at least one impinger comprising openings, the at least one impinger being supported by the barrier and separating the high pressure zone from the low pressure zone for maintaining a pressure differential between the high and low pressure zones, and (c) a variable-speed gas circulation device in fluid communication with the high pressure zone and the low pressure zone for maintaining a pressure of the high pressure zone; providing a coolant to at least one of the high pressure zone or the low pressure zone; circulating the coolant through the high and low pressure zones using the variable-speed gas circulation device; directing impingement jets of the circulating coolant through the openings of the at least one impinger and toward the moving substrate; and intermittently performing an operation on the at least one impingement apparatus during said transporting comprising: (i) reducing a speed of the variable-speed gas circulation device for decreasing the pressure differential between the high pressure zone and the low pressure zone, (ii) vibrating the at least one impinger after said reducing the speed of the variable-speed gas circulation device for breaking up snow and/or ice accumulated on the at least one impinger, and (iii) increasing the speed of the variable-speed gas circulation device after said vibrating the at least one impinger for returning the pressure differential to a pressure differential substantially similar to the pressure differential existing prior to said reducing the speed of the variable-speed gas circulation device. As used herein, "in fluid communication" means that fluid may be conveyed between the high pressure zone and the low pressure zone by direct or indirect connections which allow the fluid to pass between the zones through the gas circulation device. Such connections may comprise conduits or other known means by which the zones may be connected to deliver a fluid from one zone to the other.

In certain embodiments, the variable-speed gas circulation device may comprise a variable-speed motor and an impeller, a blower or an axial flow fan.

In certain embodiments, the operation may be performed on a regular interval, such as for a select amount of time at regular intervals. The regular interval may be implemented manually and/or automatically. For example, an operator of the method may initiate the operation manually according to the regular interval. Alternatively or additionally, the impingement apparatus may be in communication with a controller which initiates the operation according to the regular interval. The regular interval may be any desirable interval, and may be determined based on humidity and/or temperature conditions inside and/or outside the impingement apparatus, such as the humidity outside the impingement apparatus. In certain embodiments, the regular interval may be from about 5 to about 120 minutes. In certain embodiments, the regular interval may be from about 5 to about 90 minutes. In certain embodiments, the regular interval may be from about 5 to about 60 minutes. In certain embodiments, the regular interval may be from about 5 to about 30 minutes. In certain embodiments, the regular interval may be from about 5 to about 20 minutes. In certain embodiments, the regular interval may be from about 10 to about 90 minutes. In certain embodiments, the regular interval may be from about 10 to about 60 minutes. In certain embodiments, the regular interval may be from about 10 to about 30 minutes. In certain embodiments, the regular interval may be from about 10 to about 20 minutes.

In certain embodiments, the operation may be performed as needed based on snow and/or ice build-up on the impinger, such as in response to an amount of snow and/or ice having accumulated on the impinger. The determination regarding whether the operation may need to be performed may be made manually and/or automatically. For example, an operator of the method may be able to view the impinger, and initiate the operation manually when the impinger appears to be impaired by accumulated snow and/or ice. Alternatively or additionally, the impingement apparatus may be equipped with a sensor(s) capable of determining the amount of snow and/or ice accumulated on the impinger, and a controller may initiate the operation when a reading from the sensor(s) indicate that the impinger is impaired by accumulated snow and/or ice. Furthermore, the rate of accumulation of snow and/or ice on the impinger may be estimated based on ambient conditions, such as temperature and humidity, outside of the impingement apparatus. For example, the ambient humidity level surrounding the impingement apparatus may impact the rate at which snow and/or ice accumulates on the impinger.

In certain embodiments, said vibrating the impinger may be performed for a period of time sufficient to adequately break up accumulated snow and/or ice on the impinger, considering that the period of time should be brief enough to not significantly disrupt adequate cooling of the item(s) being transported within the enclosure. In certain embodiments, said vibrating the impinger lasts from or is for a duration of about 1 to about 15 seconds. In certain embodiments, said vibrating the impinger lasts from about 1 to about 10 seconds. In certain embodiments, said vibrating the impinger lasts from about 1 to about 5 seconds. In certain embodiments, said vibrating the impinger lasts from about 2 to about 5 seconds. In certain embodiments, said vibrating the impinger lasts from about 2 to about 3 seconds.

In certain embodiments, a pressure of the high pressure zone is from about 0.75 to about 4 inches of water column (from about 190 to about 1,000 Pa) when the operation is not being performed, such as during other than said intermittently performing the operation. In certain embodiments, a pressure of the high pressure zone is from about 1 to about 4 inches of water column (from about 250 to about 1,000 Pa) when the operation is not being performed. In certain embodiments, a pressure of the high pressure zone is from about 0.75 to about 3 inches of water column (from about 190 to about 750 Pa) when the operation is not being performed. In certain embodiments, a pressure of the high pressure zone is from about 1 to about 3 inches of water column (from about 250 to about 750 Pa) when the operation is not being performed. In certain embodiments, a pressure of the high pressure zone is from about 2 to about 4 inches of water column (from about 500 to about 1,000 Pa) when the operation is not being performed. In certain embodiments, a pressure of the high pressure zone is from about 2 to about 3 inches of water column (from about 500 to about 750 Pa) when the operation is not being performed.

In certain embodiments a pressure of the low pressure zone is from about −0.5 to about 0 inches of water column (from about −125 to about 0 Pa). In certain embodiments a pressure of the low pressure zone is from about −0.4 to about 0 inches of water column (from about −100 to about 0 Pa). In certain embodiments a pressure of the low pressure zone is from about −0.3 to about 0 inches of water column (from about −75 to about 0 Pa). In certain embodiments a pressure of the low pressure zone is from about −0.2 to about 0 inches of water column (from about −50 to about 0 Pa). In certain embodiments a pressure of the low pressure zone is from about −0.1 to about 0 inches of water column (from about −25 to about 0 Pa).

In certain embodiments, the pressure of the high pressure zone approaches the pressure of the low pressure zone when the operation is being performed, such as during said intermittently performing the operation.

In certain embodiments, during said vibrating the impinger, the pressure differential is decreased sufficiently to reduce the dampening effect experienced by the impinger, such that said vibrating the impinger sufficiently breaks up snow and/or ice accumulated on the impinger. In certain embodiments, the pressure differential is decreased by at least about 25 percent during said vibrating the impinger. In certain embodiments, the pressure differential is decreased by at least about 40 percent during said vibrating the impinger. In certain embodiments, the pressure differential is decreased by at least about 50 percent during said vibrating the impinger. In certain embodiments, the pressure differential is decreased by at least about 60 percent during said vibrating the impinger. In certain embodiments, the pressure differential is decreased by at least about 70 percent during said vibrating the impinger. In certain embodiments, the pressure differential is decreased by at least about 80 percent during said vibrating the impinger. In certain embodiments, the pressure differential is decreased by at least about 90 percent during said vibrating the impinger.

In certain embodiments, a temperature of the low pressure zone is from about −250° F. to about −50° F. (from about −160° C. to about −45° C.) when the operation is not being performed, such as during other than said intermittently performing the operation. In certain embodiments, a temperature of the low pressure zone is from about −250° F. to about −100° F. (from about −160° C. to about −70° C.) when the operation is not being performed. In certain embodiments, a temperature of the low pressure zone is from about −250° F. to about −150° F. (from about −160° C. to about −100° C.) when the operation is not being performed. In certain embodiments, a temperature of the low pressure zone is from about −200° F. to about −50° F. (from about −130° C. to about −45° C.) when the operation is not being performed. In certain embodiments, a temperature of the low pressure zone is from about −200° F. to about −100° F. (from about −130° C. to about −70° C.) when the operation is not being performed. In certain embodiments, a temperature of the low pressure zone is from about −200° F. to about −150° F. (from about −130° C. to about −100° C.) when the operation is not being performed.

In certain embodiments, a velocity of the impingement jets is from about 5 to about 50 m/s when the operation is not being performed, such as during other than said intermittently performing the operation. In certain embodiments, a velocity of the impingement jets is from about 5 to about 40 m/s when the operation is not being performed. In certain embodiments, a velocity of the impingement jets is from about 10 to about 50 m/s when the operation is not being performed. In certain embodiments, a velocity of the impingement jets is from about 10 to about 40 m/s when the operation is not being performed. In certain embodiments, a velocity of the impingement jets is from about 15 to about 50 m/s when the operation is not being performed. In certain embodiments, a velocity of the impingement jets is from about 15 to about 40 m/s when the operation is not being performed. In certain embodiments, a velocity of the impingement jets is from about 20 to about 50 m/s when the operation is not being performed. In certain embodiments, a velocity of the impingement jets is from about 20 to about 40 m/s when the operation is not being performed.

In certain embodiments, a velocity of the impingement jets is from about 1 to about 20 m/s during said vibrating the impinger. In certain embodiments, a velocity of the impingement jets is from about 1 to about 10 m/s during said vibrating the impinger. In certain embodiments, a velocity of the impingement jets is from about 5 to about 10 m/s during said vibrating the impinger. In certain embodiments, a velocity of the impingement jets is from about 1 to about 4 m/s during said vibrating the impinger.

In certain embodiments, the enclosure comprises a plurality of the at least one impingement apparatus. In these embodiments, the operation may performed at different times in each of the plurality of the at least one impingement apparatus; said intermittently performing the operation may occur at a different time in each corresponding one of the plurality of the at least one impingement apparatus. By performing the operation at different times in each of the plurality of the at least one impingement apparatus, any reduction in cooling of the item(s) caused by reducing the speed of the variable-speed gas circulation device in any particular impingement apparatus may be ameliorated by normal operation of the other impingement apparatus disposed within the enclosure.

Existing cooling apparatus may be retrofit to be able to perform the methods described herein, by providing an existing gas circulation device with a variable-speed drive mechanism, such as a variable speed motor. A controller may also be associated with an existing vibrator and the variable-speed drive mechanism to allow for manual and/or automatic control of the retrofitted apparatus.

Also provided is a method of reducing a temperature of at least one item (such as a food product) being transported near an impinger of a freezer and maintaining operation of said impinger, comprising: circulating a coolant for reducing the temperature and establishing a first pressure differential between opposed sides of the impinger; decreasing the first pressure differential; vibrating the impinger for breaking-up snow and/or ice having accumulated on the impinger; and re-establishing the first pressure differential.

In particular and referring to FIG. 1, there is shown an illustrative apparatus 10 comprising an enclosure 12 comprising an impingement apparatus 14. The impingement apparatus 14 comprises a barrier 16 which defines within the enclosure 12 a low pressure zone 18 and a high pressure zone 20. The impingement apparatus 14 further comprises an impinger 22, supported by the barrier 16 via support edges 17, and a variable-speed gas circulation device 24 (also referred to herein as "the device 24"). The impinger 22 also separates the low pressure zone 18 from the high pressure zone 20, and comprises openings 26 through which impingement jets 28 are directed toward a moving substrate 30, on which items 32 are transported for being chilled and/or frozen. A coolant is provided to the high pressure zone 20 via at least one conduit 34. The coolant is circulated (shown with arrows 36) by the device 24 through the high pressure zone 20 and the low pressure zone 18 via the impingement jets 28 passing through the openings 26 in the impinger 22. The arrows 36 indicate that the high pressure zone 20 and the low pressure zone 18 are in fluid communication with the device 24. Circulation of the coolant via the device 24, in conjunction with the impinger 22, results in a pressure in the high pressure zone 20 which is significantly higher than a pressure in the low pressure zone 18. In certain embodiments, the openings 26 in the impinger 22 may comprise only a small portion, such as by way only of example about 5%, of the surface area of the impinger 22. This low percentage of open area of the impinger 22 provides a back pressure which allows for substantial differential pressure between the low pressure zone 18 and the high pressure zone 20.

Intermittently, such as at regular intervals or as needed (as described above), an operation is performed to remove snow and/or ice from the impinger. The operation comprises reducing the speed of the device 24, vibrating the impinger 22, and increasing the speed of the device 24. In certain embodiments, a motor 38 with a variable-speed drive, controls the speed of the device 24. As the speed of the device 24 is reduced, the pressure in the high pressure zone 20 decreases, thereby decreasing the pressure differential between the high pressure zone 20 and the low pressure zone 18. In certain embodiments, reducing the speed of the device 24 may occur quickly, such as within 5 seconds or less. After the speed of the device 24 is reduced, the impinger 22 is vibrated using a vibrator 40 in operational contact with the impinger 22 to break up accumulated snow and/or ice on the impinger 22. In certain embodiments, vibrating the impinger 22 may last from or is for a duration of about 1 to about 15 seconds. After the vibration is completed, the speed of the device 24 is increased to resume normal operating conditions, returning the pressure differential to substantially the same pressure differential as prior to reducing the speed of the device 24. Increasing the speed of the device 24 results in turbulent flow at the high pressure zone 20 of the impinger 22, which may assist in forcing broken-up snow and/or ice through the openings 26 of the impinger 22. In certain embodiments, increasing the speed of the device 24 may occur quickly, such as within 5 seconds or less.

A controller 42, such as a manual and/or automatic controller, is in communication with the vibrator 40 and the device 24 (such as via the motor 38). The motor 38 may be positioned or mounted external to the enclosure 12 to avoid unnecessarily heating the circulating coolant 36. The controller 42 allows for manual and/or automatic control of the operation to remove snow and/or ice from the impinger 22, as described above.

Figure 2:
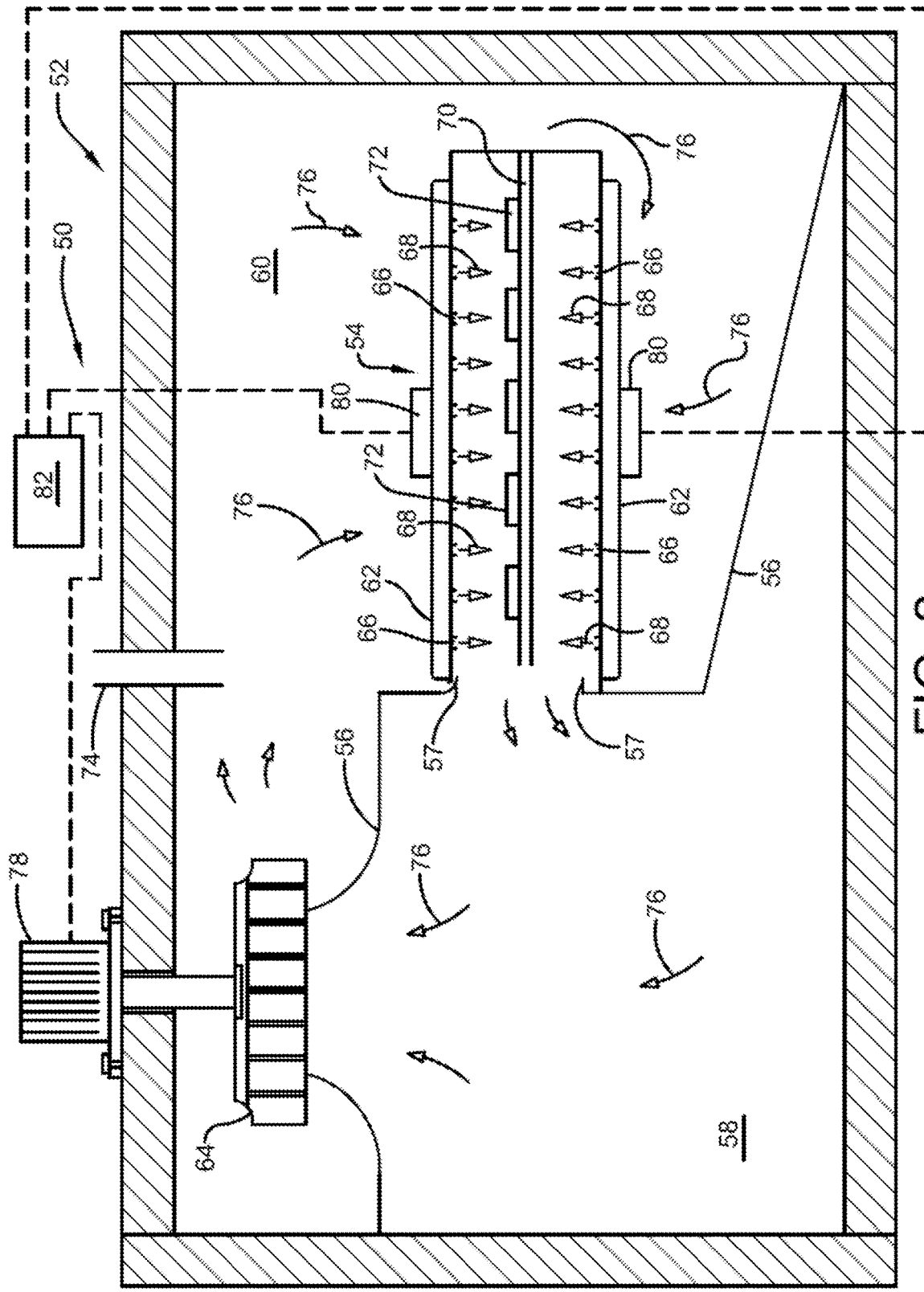
FIG. 2 is a cross-sectional view of a second embodiment of an apparatus used in the methods described herein.

In particular and referring to FIG. 2, there is shown a second illustrative apparatus 50 comprising an enclosure 52 comprising an impingement apparatus 54. The impingement apparatus 54 comprises a barrier 56 which defines a low pressure zone 58 and a high pressure zone 60. The impingement apparatus 54 further comprises two impingers 62, supported by the barrier 56 via support edges 57, and a variable-speed gas circulation device 64 (also referred to herein as "the device 64"). The barrier 56 and the impingers 62 coact to separate the low pressure zone 58 from the high pressure zone 60, with the impingers 62 comprising openings 66 for directing impingement jets 68 toward a moving substrate 70 on which items 72 are transported for being chilled and/or frozen. The substrate 70 is disposed for movement between the impingers 62. A coolant is provided to the high pressure zone 60 via at least one conduit 74. The coolant is circulated (shown with arrows 76) by the device 64, through the high pressure zone 60 and the low pressure zone 58 via the impingement jets 68 through the openings 66 in the impingers 62. The arrows 76 indicate that the high pressure zone 60 and the low pressure zone 58 are in fluid communication with the device 64. Circulation of the coolant via the device 64, in conjunction with the impingers 62, results in a pressure in the high pressure zone 60 which is significantly higher than a pressure in the low pressure zone 58. In certain embodiments, the openings 66 in the impingers 62 may comprise only a small portion, such as by way only of example about 5%, of the surface area of the impingers 62. This low percentage of open area of the impinger 62 provides a back pressure which allows for substantial differential pressure between the low pressure zone 58 and the high pressure zone 60.

Intermittently, such as at regular intervals or as needed (as described above), an operation is performed to remove snow and/or ice from the impinger. The operation comprises reducing the speed of the device 64, vibrating the impingers 62, and increasing the speed of the device 64. In certain embodiments, a motor 78 with a variable-speed drive controls the speed of the device 64. As the speed of the device 64 is reduced, the pressure in the high pressure zone 60 decreases, decreasing the pressure differential between the high pressure zone 60 and the low pressure zone 58. In certain embodiments, reducing the speed of the device 64 may occur quickly, such as within 5 seconds or less. After the speed of the device 64 is reduced, the impinger 62 is vibrated using two vibrators 80 in operational contact with a corresponding one of the impingers 62 for breaking up accumulated snow and/or ice on the impingers 62. In certain embodiments, vibrating the impingers 62 may last from about 1 to about 15 seconds. After the vibration is completed, the speed of the device 64 is increased to resume normal operating conditions, returning the pressure differential to substantially the same pressure differential as prior to reducing the speed of the device 64. Increasing the speed of the device 64 results in turbulent flow at the high pressure zone 60 of the impingers 62, which may assist in forcing broken-up snow and/or ice through the openings 66 of the impingers 62. In certain embodiments, increasing the speed of the device 64 may occur quickly, such as within 5 seconds or less.

A controller 82, such as a manual and/or automatic controller, is in communication with the vibrators 80 and the device 64 (such as via the motor 78). The motor 78 may be positioned or mounted external to the enclosure 52 to avoid unnecessarily heating the circulating coolant 76. The controller allows for manual and/or automatic control of the operation to remove snow and/or ice from the impingers 62, as described above.

Figure 3:
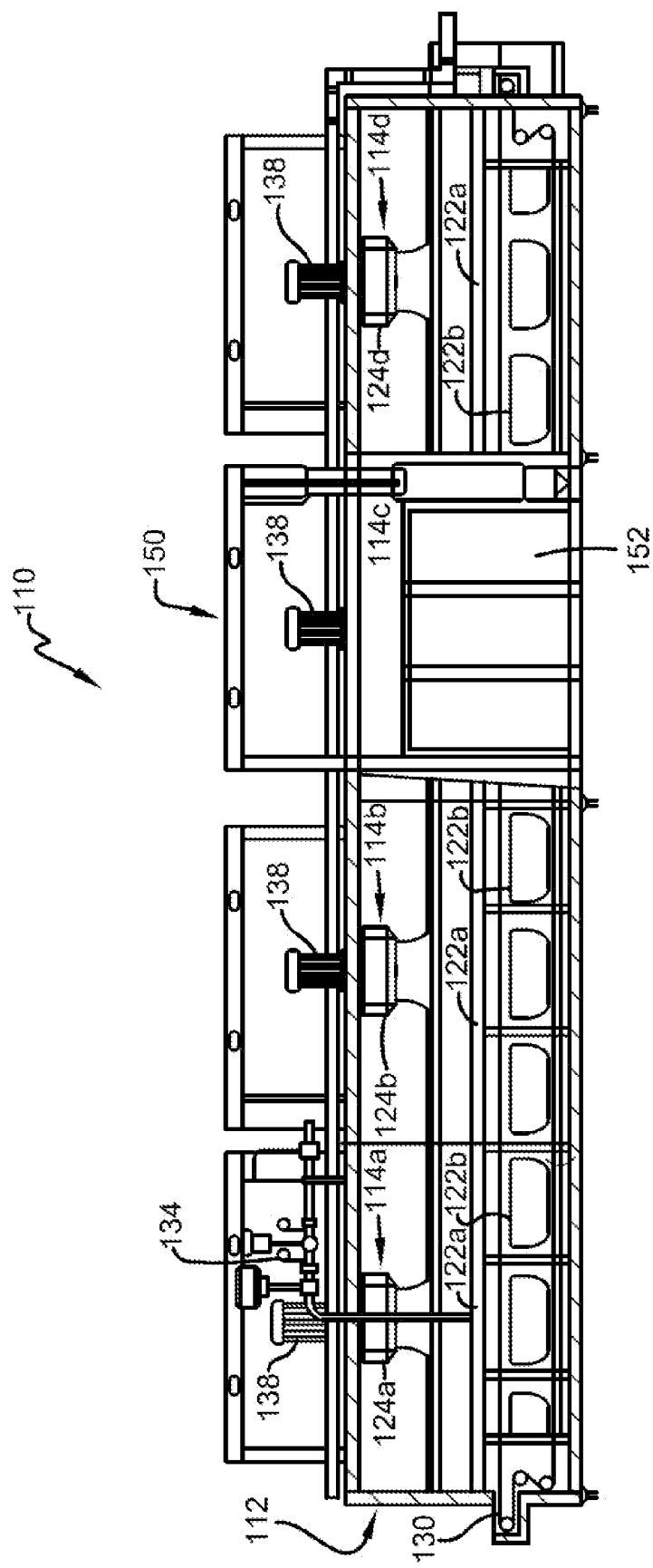
FIG. 3 is a longitudinal cross-sectional view of a third embodiment of an apparatus used in the methods described herein.
Figure 4:
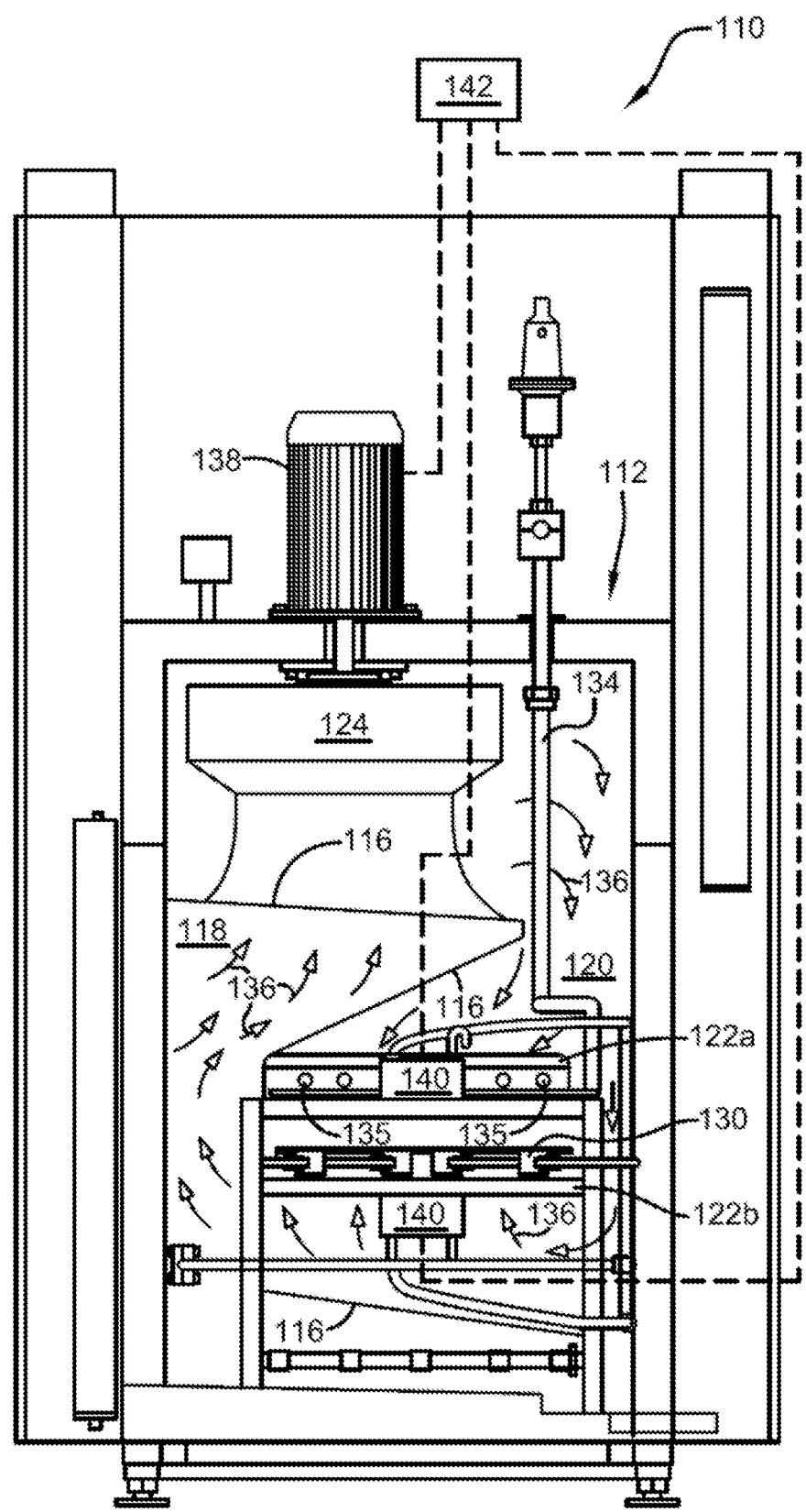
FIG. 4 is a plan view of the apparatus of FIG. 3 as seen from the entrance end of FIG. 3 with the exterior wall and inlet removed.

In particular and referring to FIGS. 3 and 4, there is shown a third illustrative apparatus 110 comprising an enclosure 112 comprising four impingement apparatus (one of which is not completely shown) 114a, 114b, 114c and 114d (also collectively referred to herein by 114). Module 150 is depicted for example in FIG. 3 so as to show an exterior door 152 which may be raised for internal access (for maintenance and repair). Thus, the impingement apparatus 114c is substantially concealed behind the door 152 as shown in FIG. 3.

Each impingement apparatus 114 comprises a barrier 116 which defines a low pressure zone 118 and a high pressure zone 20. Each impingement apparatus 114 further comprises two impingers 122a and 122b (also collectively referred to herein by 122), supported by the barrier 116, and a variable-speed gas circulation device 124a, b, and d (c being substantially concealed behind the door 152) (also referred to herein collectively as "the device 124"). The impingers 122 separate the low pressure zone 118 from the high pressure zone 120, and comprise openings (not shown) for directing impingement jets (not shown) toward a moving substrate 130, on which items (not shown) are transported. The openings, impingement jets and items referred to in these FIGS. 3-4 are similar to those features described above in FIGS. 1-2. A coolant is provided to the low pressure zone 118 via at least one conduit 134 and sprayers 135. The coolant is circulated (shown with arrows 136) by the device 124, through the high pressure zone 120 and the low pressure zone 118 via the impingement jets through openings in the impingers 122. Circulation of the coolant via the device 124, in conjunction with the impingers 122, results in a pressure in the high pressure zone 120 which is significantly higher than a pressure in the low pressure zone 118. A low percentage of open area provided by the openings of the impingers 122 provides a back pressure which allows for substantial differential pressure between the low pressure zone 118 and the high pressure zone 120.

Intermittently, such as at regular intervals or as needed (as described above), an operation is performed to remove snow and/or ice from the impinger. The operation comprises reducing the speed of the device 124, vibrating the impinger(s) 122, and increasing the speed of the device 124. In certain embodiments, it may be desirable to perform the operation at different times with respect to impingement apparatus 114a-d, such that the speed of only one of the devices 124a-d is reduced at any one time. In certain embodiments, motors 138 with variable-speed drives, control the speed of the devices 124. As the speed of the device 124 is reduced, the pressure in the high pressure zone 120 decreases, decreasing the pressure differential between the high pressure zone 120 and the low pressure zone 118. In certain embodiments, reducing the speed of the device 124 may occur quickly, such as within 5 seconds or less. After the speed of the device 124 is reduced, the impinger(s) 122 are vibrated using vibrators 140 in operational contact with a corresponding one of the impinger(s) 122 for breaking up accumulated snow and/or ice on the impinger(s) 122. In certain embodiments, vibrating the impinger(s) 122 may last from about 1 to about 15 seconds. After the vibration is completed, the speed of the device 124 is increased to resume normal operating conditions, returning the pressure differential to substantially the same pressure differential as prior to reducing the speed of the device 124. Increasing the speed of the device 124 results in turbulent flow on the high pressure zone side of the impinger(s) 122, which may assist in forcing broken-up snow and/or ice through the openings of the impinger(s) 122. In certain embodiments, increasing the speed of the device 124 may occur quickly, such as within 5 seconds or less.

A controller 142, such as a manual and/or automatic controller, is in communication with the vibrators 140 and the device 124 (such as via the motor 138). The motor 138 may be positions or mounted external to the enclosure 112 to avoid unnecessarily heating the circulating coolant 136. The controller allows for manual and/or automatic control of the operation to remove snow and/or ice from the impinger(s) 122, as described above.

In a first embodiment, there is provided a method of reducing a temperature of at least one item comprising:

transporting the at least one item on a moving substrate within an enclosure, the enclosure comprising at least one impingement apparatus comprising: (a) a barrier defining a low pressure zone and a high pressure zone within the enclosure, (b) at least one impinger comprising openings, the at least one impinger being supported by the barrier and separating the high pressure zone from the low pressure zone, for maintaining a pressure differential between the high and low pressure zones, and (c) a variable-speed gas circulation device in fluid communication with the high pressure zone and the low pressure zone for maintaining a pressure of the high pressure zone; providing a coolant to at least one of the high pressure zone or the low pressure zone; circulating the coolant through the high and low pressure zones using the variable-speed gas circulation device; directing impingement jets of the circulating coolant through the openings of the at least one impinger and toward the moving substrate; and intermittently performing an operation on the at least one impingement apparatus during said transporting comprising: (i) reducing a speed of the variable-speed gas circulation device for decreasing the pressure differential between the high pressure zone and the low pressure zone, (ii) vibrating the at least one impinger after said reducing the speed of the variable-speed gas circulation device for breaking up snow and/or ice accumulated on the at least one impinger, and (iii) increasing the speed of the variable-speed gas circulation device after said vibrating the at least one impinger for returning the pressure differential to a pressure differential substantially similar to the pressure differential existing prior to said reducing the speed of the variable-speed gas circulation device.

The method of the first embodiment may include that said performing the operation is for a select amount of time at regular intervals. The regular intervals may each occur from about every 5 to about every 120 minutes, or optionally from about every 5 to about every 90 minutes, or further optionally from about every 5 to about every 60 minutes, or further optionally from about every 5 to about every 30 minutes, or further optionally from about every 5 to about every 20 minutes, or further optionally from about every 10 to about every 90 minutes, or further optionally from about every 10 to about every 60 minutes, or further optionally from about every 10 to about every 30 minutes, or further optionally from about every 10 to about every 20 minutes.

The method of either the first or subsequent embodiments may include that said performing the operation is as needed in response to an amount of snow and/or ice having accumulated on the impinger 22. A sensor 44 as shown in FIG. 1 for use with any of the first or subsequent embodiments may be positioned at the impinger 22 for sensing or determining the accumulated snow and/or ice and providing a reading to the controller 42, 82, 142.

The method of any of the first or subsequent embodiments may include that said vibrating the at least one impinger is for a duration of from about 1 to about 15 seconds, or optionally from about 1 to about 10 seconds, or further optionally from about 1 to about 5 seconds, or further optionally from about 2 to about 5 seconds, or further optionally from about 2 to about 3 seconds.

The method of any of the first or subsequent embodiments may include that a pressure of the high pressure zone is from about 0.75 to about 4 inches of water column (from about 190 to about 1,000 Pa), or optionally from about 1 to about 4 inches of water column (from about 250 to about 1,000 Pa), or further optionally from about 0.75 to about 3 inches of water column (from about 190 to about 750 Pa), or further optionally from about 1 to about 3 inches of water column (from about 250 to about 750 Pa), or further optionally from about 2 to about 4 inches of water column (from about 500 to about 1,000 Pa), or further optionally from about 2 to about 3 inches of water column (from about 500 to about 750 Pa) during other than said intermittently performing the operation.

The method of any of the first or subsequent embodiments may include that a pressure of the low pressure zone is from about −0.5 to about 0 inches of water column (from about −125 to about 0 Pa), or optionally from about −0.4 to about 0 inches of water column (from about −100 to about 0 Pa), or further optionally from about −0.3 to about 0 inches of water column (from about −75 to about 0 Pa), or further optionally from about −0.2 to about 0 inches of water column (from about −50 to about 0 Pa), or further optionally from about −0.1 to about 0 inches of water column (from about −25 to about 0 Pa).

The method of any of the first or subsequent embodiments may include that the pressure of the high pressure zone approaches the pressure of the low pressure zone during said intermittently performing the operation.

The method of any of the first or subsequent embodiments may include that the pressure differential is decreased by at least about 25 percent, or optionally at least about 40 percent, or further optionally at least about 50 percent, or further optionally at least about 60 percent, or further optionally at least about 70 percent, or further optionally at least about 80 percent, or further optionally at least about 90 percent, during said vibrating the at least one impinger.

The method of any of the first or subsequent embodiments may include that a temperature of the low pressure zone is from about −250° F. to about −50° F. (from about −160° C. to about −45° C.), or optionally from about −250° F. to about −100° F. (from about −160° C. to about −70° C.), or further optionally from about −250° F. to about −150° F. (from about −160° C. to about −100° C.), or further optionally from about −200° F. to about −50° F. (from about −130° C. to about −45° C.), or further optionally from about −200° F. to about −100° F. (from about −130° C. to about −70° C.), or further optionally from about −200° F. to about −150° F. (from about −130° C. to about −100° C.) during other than said intermittently performing the operation.

The method of any of the first or subsequent embodiments may include said directing the impingement jets is at a velocity of from about 5 to about 50 m/s, or optionally from about 5 to about 40 m/s, or further optionally from about 10 to about 50 m/s, or further optionally from about 10 to about 40 m/s, or further optionally from about 15 to about 50 m/s, or further optionally from about 15 to about 40 m/s, or further optionally from about 20 to about 50 m/s, or further optionally from about 20 to about 40 m/s during other than said intermittently performing the operation.

The method of any of the first or subsequent embodiments may include that a velocity of the impingement jets is from about 1 to about 20 m/s, or optionally from about 1 to about 10 m/s, or further optionally from about 5 to about 10 m/s, or further optionally from about 1 to about 4 m/s, during said vibrating the at least one impinger.

The method of any of the first or subsequent embodiments may include that the enclosure comprises a plurality of the at least one impingement apparatus. Said intermittently performing the operation may occur at a different time in each corresponding one of the plurality of the at least one impingement apparatus.

The method of any of the first or subsequent embodiments may include that the at least one item comprises a food product.

In a second embodiment, there is provided a method of retrofitting an existing cooling apparatus to provide a retrofitted cooling apparatus, comprising: providing a variable-speed drive mechanism to an existing gas circulation device of the existing cooling apparatus; and connecting a controller to the variable-speed drive mechanism and an existing vibrator of the existing cooling apparatus, wherein the retrofitted cooling apparatus is capable of performing the method(s) of any of the first or subsequent embodiments.

In a third embodiment, there is provided a method of reducing a temperature of at least one item being transported near an impinger of a freezer and maintaining operation of said impinger, comprising: circulating a coolant for reducing the temperature and establishing a first pressure differential between opposed sides of the impinger; decreasing the first pressure differential; vibrating the impinger for breaking-up snow and/or ice having accumulated on the impinger; and re-establishing the first pressure differential.

The method of the third embodiment may include that the at least one item comprises a food product.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A method of reducing a temperature of at least one item, comprising:
transporting the at least one item on a moving substrate within an enclosure, the enclosure comprising at least one impingement apparatus comprising:
   (a) a barrier defining a low pressure zone and a high pressure zone within the enclosure,
   (b) at least one impinger comprising openings, the at least one impinger being supported by the barrier and separating the high pressure zone from the low pressure zone, for maintaining a pressure differential between the high and low pressure zones, and
   (c) a variable-speed gas circulation device in fluid communication with the high pressure zone and the low pressure zone for maintaining a pressure of the high pressure zone, the variable-speed gas circulation device selected from the group consisting of a variable speed motor and an impeller, a blower, and an axial flow fan;
providing a coolant to at least one of the high pressure zone or the low pressure zone;
circulating the coolant through the high and low pressure zones using the variable-speed gas circulation device;
directing impingement jets of the circulating coolant through the openings of the at least one impinger and toward the moving substrate;
sensing any snow and ice accumulated on the at least one impinger; and
intermittently performing an operation on the at least one impingement apparatus during said transporting, the operation comprising:
   (i) reducing a speed of the variable-speed gas circulation device for providing a decreased pressure differential between the high pressure zone and the low pressure zone,
   (ii) vibrating the at least one impinger during the decreased pressure differential for breaking up the any snow and ice accumulated on the at least one impinger and forcing some broken-up snow and ice through the openings in the at least one impinger, and
   (iii) increasing the speed of the variable-speed gas circulation device after said vibrating the at least one impinger is completed for re-establishing the pressure differential from the decreased pressure differential to be substantially similar to the pressure differential existing prior to said reducing the speed of the variable-speed gas circulation device.

2. The method of claim 1, wherein said performing the operation is for a select amount of time at regular intervals.

3. The method of claim 2, wherein the regular intervals each occur from every 5 to every 120 minutes.

4. The method of claim 1, wherein said vibrating the at least one impinger is for a duration of from 1 to 15 seconds.

5. The method of claim 1, wherein a pressure of the high pressure zone is from 0.75 to 4 inches of water column (from 190 to 1,000 Pa) during other than said intermittently performing the operation.

6. The method of claim 5, wherein a pressure of the low pressure zone is from −0.5 to 0 inches of water column (from −125 to 0 Pa).

7. The method of claim 6, wherein the pressure of the high pressure zone approaches the pressure of the low pressure zone during said intermittently performing the operation.

8. The method of claim 1, wherein the pressure differential is decreased by at least 25 percent during said vibrating the at least one impinger.

9. The method of claim 1, wherein a temperature of the low pressure zone is from −250° F. to −50° F. (from −160° C. to −45° C.) during other than said intermittently performing the operation.

10. The method of claim 1, wherein said directing the impingement jets is at a velocity of from 5 to 50 m/s during other than said intermittently performing the operation.

11. The method of claim 1, wherein a velocity of the impingement jets is from 1 to 20 m/s during said vibrating the at least one impinger.

12. The method of claim 1, wherein the enclosure comprises a plurality of the at least one impingement apparatus.

13. The method of claim 12, wherein said intermittently performing the operation occurs at a different time in each corresponding one of the plurality of the at least one impingement apparatus.

14. The method of claim 1, wherein the at least one item comprises a food product.

* * * * *